No. 638,727. Patented Dec. 12, 1899.
A. J. LAUCH.
FRAME FOR MEASURING SPECTACLES.
(Application filed Nov. 26, 1898.)
(No Model.)
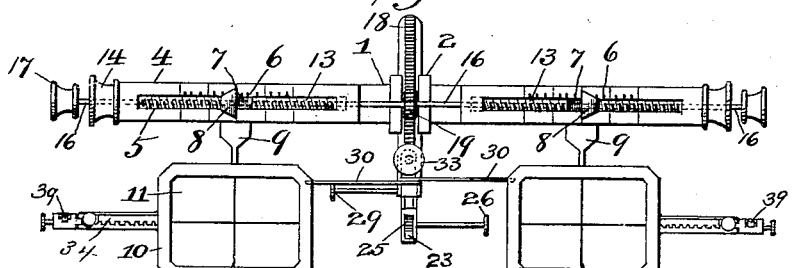
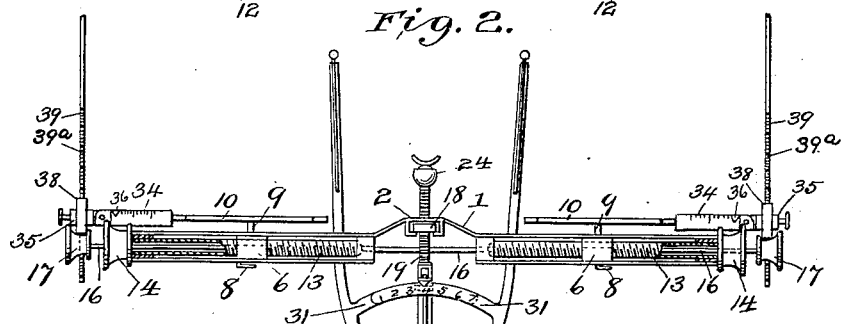
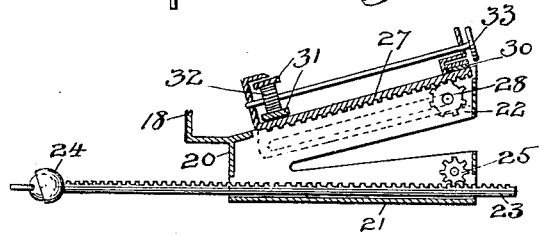
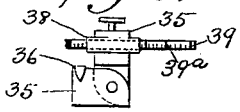
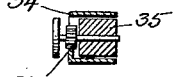
Witnesses
Jos. H. Blackwood
Hartwell P. Heath
Inventor
Alphonse J. Lauch
by D. A. Gowrick Attorney
THE NORRIS PETERS CO., PHOTO-LITHO., WASHINGTON, D. C.

UNITED STATES PATENT OFFICE.

ALPHONSE J. LAUCH, OF KANKAKEE, ILLINOIS, ASSIGNOR TO CHARLES F. WHITMORE, OF SAME PLACE.

FRAME FOR MEASURING SPECTACLES.

SPECIFICATION forming part of Letters Patent No. 638,727, dated December 12, 1899.

Application filed November 26, 1898. Serial No. 697,511. (No model.)

*To all whom it may concern:*

Be it known that I, ALPHONSE J. LAUCH, a citizen of the United States, residing at Kankakee, in the county of Kankakee and State of Illinois, have invented certain new and useful Improvements in Frames for Measuring Spectacles, of which the following is a specification.

My invention relates to frames for measuring spectacles, and has for one of its objects to provide means of determining independently for each eye the distance between the center of the spectacle-frame and the center of the pupil when looking at a distant object.

Another object of my invention is to provide means of determining the height of the point on the patient's nose where the crest of the spectacle-bridge should rest, measuring from the pupillary line to the lower edge of the crest of the bridge by side adjustment.

Another object of my invention is to provide means of determining the distance between the back edge of the crest of the spectacle-bridge and the back plane of the lenses when the latter are placed as near as possible to the eye without striking the lashes.

Another object of my invention is to provide means of determining the length of the shanks from the plane of the lenses to the lower points of the bridge.

Another object of my invention is to provide means of determining the width of the bridge at the base—that is, the distance between the lower points of the bridge.

Another object of my invention is to provide means of determining the distance between each temple and the center of the spectacle-frame independently of the pupillary distance.

Another object of my invention is to provide means of determining the length of the temples.

These objects I accomplish in the manner and by the means hereinafter more fully described in detail and particularly pointed out in the claims, reference being had to the accompanying drawings, in which like numerals indicate like parts in all the figures.

Figure 1 is a front elevation of my invention; Fig. 2, a top plan view of same, partially sectional; Fig. 3, a cross-section of arms, carrier, and frame-holder; Fig. 4, a side elevation of nose-piece-adjusting device, partly in section; Fig. 5, a side elevation of part of lens-frame, showing racked arms and sliding blocks partly in section; Fig. 6, a detailed top plan view of sliding blocks 35, and Fig. 7 a cross-section of inner block 35.

My invention consists of a bar 1, of suitable length, width, and thickness, provided at its center with a vertical slide 2 and with longitudinal slots 3, extending from near each end to within a short distance of the slide 2. Two strips 4, provided with longitudinal slots 5, registering with the slots 3, are secured to the bar 1 or made integral therewith at a sufficient distance from the bar 1 to permit the carriers 6, hereinafter described, to move between the strips 4 and the bar 1. Graduated scales showing the distance from the center of the bar 1 are marked on the outer surface of the strips 4. Carriers 6, provided with wings 7, which slide in the slots 3 and 5, fit between the strips 4 and bar 1. Attached to the outer wings 7 are index-fingers 8, adapted to register with the scale on the strips 4. Secured to the carriers 6 or made integral therewith are arms 9, which are bent downward and backward, and have attached to their ends lens-frames 10, carrying plain lenses 11, divided into four quarters by a cross 12. A hollow sleeve 13, screw-threaded exteriorly and provided at its outer end with a thumb-piece 14, having a hole through its center, extends from each end of the bar 1 between the strip 4 and bar 1. The carrier 6 has a hole 15 through the center, screw-threaded interiorly complementary to the screw-threads on said sleeve 13, in which hole 15 the sleeve 13 works. Extending through the sleeves 13, thumb-pieces 14, and from end to end of the bar 1 is a steel rod 16, provided at each end with a thumb-piece 17.

A bar 18, notched in front and having a graduated scale on the back, fits in the slide 2. A small cog-wheel 19 is mounted on the steel rod 16 and adapted to engage the notches on the bar 18 and move the bar 18 up or down. The lower end of the bar 18 is bent outward at a right angle and then down at a right angle, forming a right-angle recess 20. Secured to the outside of the elbow thus formed or made integral therewith are two hollow arms, one, 21, extending horizontally outward, and the other, 22, extending outward and upward at the angle of about forty degrees. In the horizontal arm 21 a bar 23 is placed. The bar 23 has a notched top and at its inner end a nose-piece 24, connected with it by a ball or universal joint. A small cog-wheel 25, adapted to engage the notched top of the bar 23, is mounted on a shaft journaled in the arm 21, which shaft extends beyond the arm 21 on the right hand and is provided with a thumb-piece 26. The bar 23 may have a graduated scale on its side. A slide 27, having on each side downwardly-projecting flanges provided with longitudinal slots and one having an index-finger at its inner end, is placed on the arm 22, which may have a scale marked on its side. The under side of the top of the slide 27 is notched and the ends turned up at right angles and perforated. A small cog-wheel 28, adapted to engage the notched surface of the slide 27, is mounted on a shaft journaled in the arm 22 and projecting into the slots in the flanges of the slide 27, the left-hand end of such shaft being provided with a thumb-piece 29. Arms 30 of suitable length have their ends overlapped and pivotally secured at the outer end of the slide 27 and their free ends provided with small round knobs. Secured to the arms 30 or made integral therewith are arc-shaped measuring-plates 31, provided with a graduated scale and adapted to overlap each other, the under surface of the upper and the upper surface of the lower being notched. A small cog-wheel 32, adapted to engage the notched surface of said measuring-plates 31 and move the arms 30 apart or together, is mounted on a shaft journaled in the perforated ends of the top of the slide 27 and provided at its outer end with a thumb-piece 33. The inner end of the top of the slide 27 is pointed and turned down over the measuring-plates 31 as an index-finger.

Secured to the outer sides of the lens-frames 10 or made integral therewith and extending outward are arms 34, having top and bottom, but open at the rear and outer end, and in front having longitudinal slots open at the outer ends and provided along their lower edges with toothed racks. A graduated scale may be marked on top of the arms 34. Two blocks 35 are pivotally secured together at one side and horizontally connected by a tongue and groove, permitting free horizontal movement, but no vertical movement, and are adapted to slide in the arms 34. Secured to the rear of the inner block 35, near the top toward the inner side of the inner block 35, is an index-finger 36, which extends upward above the inner block 35 and is then bent forward over the arm 34. A toothed wheel 37, adapted to engage the toothed rack in the arm 34, is mounted on a spindle fixed in the front face of the inner block 35 and provided with a thumb-wheel. The outer block 35 has a crosswise slot in its top near the outer end in which a guide 38, open at the bottom, is fixed. In the guide 38 a bar 39 moves, the outer part of which is notched on its under side and may be marked on its side with a graduated scale $39^a$. A cog-wheel 40, adapted to engage said notched under side, is mounted in block 35 and provided with a thumb-piece.

The operation of my invention is as follows: The center of the bar 1 is placed at the center line of the nose of the patient. The thumb-pieces 14 are used to adjust the lenses 11 until the center of each lens 11 is directly in front of the center of the pupil of the eye. Each lens 11, having a carrier 6, operated by a sleeve 13, may be adjusted independently and the distance of the center of the pupil of each eye from the center of the bar 1 determined separately. The lenses 11 are now placed as near the eyes as possible without striking the lashes, and the bar 18, by means of the thumb-pieces 17, is raised or lowered until the nose-piece 24 is directly in front of the point on the patient's nose where the crest of the spectacle-bridge should rest. This measures the distance from the pupillary line to the lower edge of the crest of the bridge. By means of the thumb-pieces 26 the nose-piece 24 is moved until it rests against the patient's nose, the universal joint allowing it to adjust itself readily to the nose. This determines the distance between the back plane of the lenses 11 to the back edge of the crest. By means of thumb-pieces 29 the slide 27 is moved up or down the arm 22 until the knobs on the ends of arms 30 rest against the patient's face at the base of the nose, determining length of shanks from the plane of the lenses 11 to lower points of the bridge. The thumb-piece 33 now brings the arms 30 nearer together or spreads them apart, as may be necessary, until the end of one of the arms 30 rests on each side of the nose at the base, when the index-finger will indicate on the scale marked on the measuring-plate 31 the width of the bridge — that is, the distance between the lower points of the bridge. By means of the toothed wheel 37 the blocks 35 are moved in or out along the arm 34, the index-finger pointing on the scale to the width of the temples, and finally by means of the bar 39 the length of the temples is determined.

Having thus described my invention, what I claim as new, and desire to secure by Letters Patent, is—

1. In a spectacle-measuring frame provided with a nose-piece, a pair of measuring-arms separate from the nose-piece and pivotally attached at their outer ends to the nose-piece support, said arms adapted to be moved in and out in a plane at right angles to the face, substantially as shown and described.

2. In a spectacle-measuring frame, provided with vertical and horizontal nose-piece adjustment, a pair of measuring-arms separate from the nose-piece and pivotally attached at their outer ends to the nose-piece support, said arms adapted to be moved in and out in a plane at right angles to the face, substantially as shown and described.

3. In a spectacle-measuring frame, provided with vertical and horizontal nose-piece adjustment, a pair of measuring-arms separate from the nose-piece and pivotally attached at their outer ends to a slide carried by the nose-piece support, such slide being adapted to move said arms to or from the face, substantially as shown and described.

4. In a spectacle-measuring frame, provided with vertical and horizontal nose-piece adjustment, arms, pivotally connected, at one end and to the nose-piece support and carrying graduated scales adapted to measure the distance between their free ends, said arms provided with means of moving their free ends from or toward each other, substantially as shown and described.

5. In a spectacle-measuring frame provided with vertical and horizontal nose-piece adjustment, measuring-arms pivotally connected at one end and to a slide attached to the nose-piece support, such slide being adapted to move said arms to or from the face, said arms carrying graduated scales adapted to measure the distance between their free ends and provided with means for moving their free ends from or toward each other, substantially as shown and described.

6. In a spectacle-measuring frame, a graduated arm attached to the outer edge of the lens-frame and a block movable along said arm and adapted to measure the distance between each temple and the center of the spectacle-frame, substantially as shown and described.

7. In a spectacle-measuring frame, a graduated arm attached to the outer edge of each lens-frame, a block movable along said arm and a graduated arm movable at right angles to said first-mentioned arm through said block, substantially as shown and described.

8. In a spectacle-measuring frame, a graduated arm attached to the outer side of the lens-frame, a block, movable along said arm, a block pivoted horizontally to said block and provided on top with a slot normally at right angles to said graduated arm, a guide in said slot, and a graduated arm moving in said guide, substantially as shown and described.

9. In a spectacle-measuring frame, a slide carrying the nose-piece and a rod extending across said frame and provided with a thumb-piece at each end, said rod engaging said slide and adapted to raise and lower the same, substantially as shown and described.

10. In a spectacle-measuring frame, a slide carrying the nose-piece and a rod extending crosswise said frame and provided with a thumb-piece at each end, said rod engaging said slide and adapted to raise and lower the same, substantially as shown and described.

11. A spectacle-measuring frame, consisting of a bar provided with a vertical slide in the center and with vertical and horizontal slots extending from near each end to within a short distance of said slide, carriers provided with wings adapted to move in said slots and with holes interiorly screw-threaded, arms extending downward and backward from said carriers and provided with lens-frames, hollow sleeves exteriorly screw-threaded complementary to the holes in said carriers working in said vertical slots, said sleeves provided at their outer ends with thumb-pieces, having holes through the center, a graduated arm notched on one side moving in said vertical slide, a rod passing through said thumb-pieces and said sleeves and provided at its ends with thumb-pieces, said rod, having mounted on its center a cog-wheel adapted to engage the notched surface of said arm, two hollow arms meeting at an acute angle and secured at the apex to the lower end of said arm, a bar adapted to be moved along said lower hollow arm and having at its inner end a nose-piece on a universal joint, arms pivotally connected at one end and to a slide adapted to move along the upper hollow arm, said arms carrying graduated scale-plates and movable from and toward each other, hollow arms having graduated scales on their tops and extending sidewise from the outer side of the lens-frames, a block adapted to slide in said hollow arms, a block pivotally jointed to said block horizontally and having in its top a crosswise slot, a guide in said slot and a graduated bar working in said guide and adapted to be moved back and forth, substantially as shown and described.

In testimony whereof I hereto affix my signature in the presence of two witnesses.

ALPHONSE J. LAUCH.

Witnesses:
ALBERT KURRASCH, Sr.,
J. BERT. MILLER.